United States Patent [19]

Schmeidl

[11] Patent Number: 4,895,961
[45] Date of Patent: Jan. 23, 1990

[54] PREPARATION OF ESTERIFIED RHODAMINE DYES

[75] Inventor: Karl Schmeidl, Ludwigshafen, Fed. Rep. of Germany

[73] Assignee: BASF Aktiengesellschaft, Ludwigshafen, Fed. Rep. of Germany

[21] Appl. No.: 167,114

[22] Filed: Mar. 11, 1988

[51] Int. Cl.$^4$ .......................................... C07D 311/88
[52] U.S. Cl. .................................................. 549/227
[58] Field of Search ......................................... 549/227

[56] References Cited

U.S. PATENT DOCUMENTS

| | | | |
|---|---|---|---|
| 438,053 | 10/1890 | Boedeker | 549/227 |
| 1,981,516 | 10/1931 | Kyrides | 549/227 |
| 2,153,059 | 4/1939 | Eckert et al. | 549/227 |
| 3,767,358 | 10/1973 | Stryker | 549/227 |
| 3,849,065 | 11/1974 | Schmeidl | 549/227 |

FOREIGN PATENT DOCUMENTS 3531272  3/1987  Fed. Rep. of Germany .

OTHER PUBLICATIONS

Chem. Abstract, 107: 41694a, 1987 (Ger. Pat. No. DE 3,531,272, 3.12.87, filed 9-2-85).

*Primary Examiner*—Glennon H. Hollrah
*Assistant Examiner*—Ba K. Trinh
*Attorney, Agent, or Firm*—Oblon, Spivak, McClelland, Maier & Neustadt

[57] ABSTRACT

Completely esterified rhodamine dyes of the formula

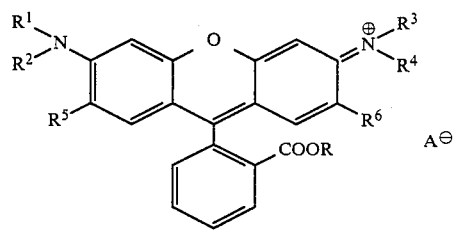

where R, $R^2$ and $R^4$ are independently of one another methyl or ethyl, $R^1$ and $R^3$ are independently of one another hydrogen, methyl or ethyl, $R^5$ and $R^6$ are independently of one another hydrogen or methyl and $A^\ominus$ is an anion, are prepared from compounds of the formula II

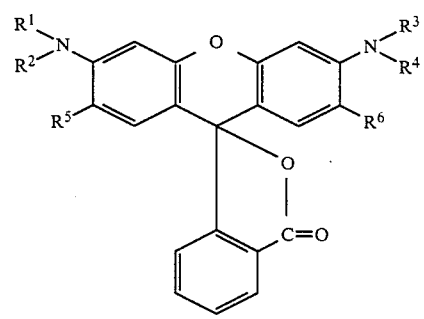

or from the corresponding water addition products by esterification with dialkyl sulfates in solvents by using γ-butyrolactone, alkylene carbonates, dialkyl carbonates, methoxypropyl acetate or dialkyl phthalates as solvent and working in the presence of an excess of a base, based on dialkyl sulfate.

26 Claims, No Drawings

PREPARATION OF ESTERIFIED RHODAMINE DYES

The present invention relates to a process for preparing a completely esterified rhodamine dye of the formula I

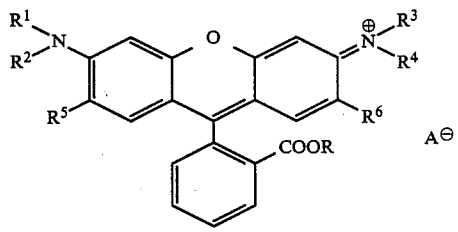

where R, $R^2$ and $R^4$ are identical or different and each is independently of the other$ methyl or ethyl, $R^1$ and $R^3$ are identical or different and each is independently of the other hydrogen, methyl or ethyl, $R^5$ and $R^6$ are identical or different and each is independently of the other hydrogen or methyl, and $A^\ominus$ is an anion, from a compound of the formula II

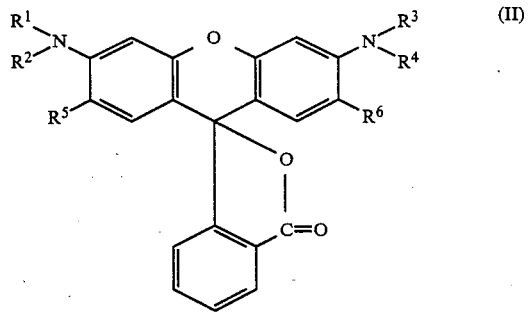

or from a corresponding water addition product by esterification with a dialkyl sulfate in a solvent, which comprises using Y-butyrolactone, alkylene carbonate, dialkyl carbonate, methoxypropyl acetate or a dialkyl phthalate as solvent and working in the presence of an excess of a base, based on the dialkyl sulfate.

Anions $A^\ominus$ are for example fluoride, chloride, bromide, sulfate, phosphate, methosulfate, ethosulfate, formate, acetate, propionate, lactate and trichlorozincate.

Specific solvents besides Y-butyrolactone are for example ethylene carbonate, 1,2-propylene carbonate, 1,2-n-butylene carbonate, 1,2-isobutylene carbonate, dimethyl carbonate, diethyl carbonate, dipropyl carbonate, dimethyl phthalate, diethyl phthalate, dipropyl phthalate, dibutyl phthalate and dioctyl phthalate.

These solvents can be used alone or in the form of mixtures, for example as a mixture of 40 parts of propylene carbonate and 60 parts of ethylene carbonate. Still other solvents can be present in the mixture, for example toluene or xylene mixed with propylene carbonate, ethylene carbonate or butyrolactone or even a mixture of diethyl carbonate and methylglycol acetate.

Suitable bases are for example alkali metal hydroxides or oxides, alkaline earth metal hydroxides or oxides, basic aluminum oxides and tertiary organic amines containing sterically hindered nitrogen.

Specific bases are for example lithium hydroxide, sodium hydroxide, potassium hydroxide, magnesium hydroxide, calcium hydroxide, barium hydroxide, magnesium oxide, calcium oxide and barium oxide. Specific organic amines are for example N-isopropyl-N,N-diisopropanolamine, N-isobutyl-N,N-diisopropanolamine, triisopropanolamine and N-cyclohexyl-N,N-diisopropanolamine.

Of the tertiary organic amines, the hydroxyl-bearing compounds are preferred because of the ready solubility of the salts in the liquid formulations. Although these amines react in the solvents according to the invention with the dialkyl sulfates even at room temperature or a slightly higher temperature, the compounds of the formula II are surprisingly completely esterified nonetheless.

Of the bases mentioned, preference is given to N-isopropyl-N,N-diisopropanolamine, calcium oxide and calcium hydroxide.

Suitable dialkyl sulfates are dimethyl sulfate and diethyl sulfate. Based on the compound of the formula II, the dialkyl sulfate is used in a not less than stoichiometric amount, but preferably in a somewhat super stoichiometric amount. The excess depends in particular on the water content of the color bases of the formula II. Technical grade products having a water content from about 1 to 3% by weight, based on the color base, are highly suitable. With water contents of about 4% by weight and upward it is advantageous to dehydrate the color base prior to the treatment with the dialkyl sulfate. The amount used per mole of color base is from 1.01 to 1.5 moles, preferably from 1.05 to 1.2 moles, of dialkyl sulfate.

The bases are used in excess, relative to the excess of dialkyl sulfate. Organic tertiary amines containing sterically hindered nitrogen as described for example in DE-A-1,770,782 are used in an excess from 0.5 to 2 moles per mole of dialkyl sulfate excess. In the case of inorganic bases, an excess of up to 6 moles can surprisingly be required. In addition, the more finely divided bases of low bulk density are more effective. Advantageous bulk densities are for example in the case of magnesium oxide and magnesium hydroxide less than 500 grams/liter and in the case of calcium hydroxide about 400 grams/liter. The inorganic bases act at least to some extent as pigmentary substances; a large surface area is of advantage. The action of these bases is tied to the use of the solvents according to the invention, because their presence in esterifications in toluene, xylene, methyldiglycol or dimethylformamide alone does not lead to complete conversion.

The esterification advantageously comprises dissolving or suspending the compound of the formula II in the solvent, if necessary removing excess water by heating, then adding the base and finally the dialkyl sulfate at room temperature, and heating with stirring to about 120°C. About 1 to 2 hours later the reaction is complete. The hot or somewhat cooled reaction mixture is then admixed with further solvent and worked up to give a liquid formulation or, after dilution with water, a pulverulent dye.

Surprisingly, the esterification is virtually quantitative. This is of advantage, in particular as regards the shelf life of liquid formulations of dyes for paper and the waterfastness of liquid dyes for printing inks. A further advantage of the process is that, after the reaction, no recovery of color bases of the formula II is required and that it is possible to dispense with the chlorinated hydrocarbons which are customarily used in the alkylation.

To produce dye powders, the esterification is advantageously carried out in ethylene carbonate or propylene carbonate. After the esterification, the solvent can be recovered at least partly by distillation. An advantageous method of working comprises using only small amounts of a cyclic ester for the esterification and dispensing with recovery.

For example, per 1 part of the compound of the formula II not more 0.5 part of ethylene carbonate is required for carrying out the process in a stirred kettle. The base is preferably a calcium hydroxide of voluminous form. After the esterification, the formation of chlorohydrins in the course of the subsequent isolation of the dye in the form of a chloride on treatment with hydrochloric acid is best avoided by at least partly hydrolyzing the cyclic carbonic esters before acidification. The ethylene glycol or propylene glycol formed in the course of the hydrolysis favors the subsequent dissolving and reprecipitation from water. The dye esters of the formula I are preferably precipitated as chlorides from aqueous solution after addition of sodium chloride. They are obtained in high yield, good purity and ready solubility.

The amount of solvent can be reduced still further by performing the reaction in a paddle dryer.

To produce liquid formulations which are miscible with water in any proportion and are advantageously useable for the wet-end coloring of paper, γ-butyrolactone is preferred together with triisopropanolamine. For example, 1 part of γ-butyrolactone is sufficient per part of color base of the formula II. After the esterification, further solvents, preferably acetic acid, are then added to obtain storable solutions. In this way it is possible to obtain for example storable solutions of the compound of the formula I where $A^\ominus$ is in general a mixture of methosulfate or ethosulfate and sulfate and, if acetic acid is used, acetate.

Compared with products described in DE-A-No. 2,138,178, DE-A-No. 2,138,179, U.S. Pat. No. 3,767,358 or DE-A-No. 2,228,260, the exhaustion of the bath in wet-end coloring strength has been enhanced to such an extent that a 0.5% dyeing leaves virtually no colored wastewater.

To produce liquid formulations based on highly volatile solvents it is possible for example to use diethyl carbonate. Dye solutions of this type are suitable for use as flexographic printing inks, in particular on addition of laking agents, such as tannin. If the esterification is carried out in high-boiling solvents such as dibutyl phthalate, it is possible in the same way to obtain solutions which can be used for example as inks in ink jet processes.

EXAMPLE 1

In a stirred kettle, 471 parts of propylene carbonate (technical grade) are stirred for about 15 minutes with 30 parts of calcium hydroxide (bulk density 400 grams/liter). The temperature should not exceed 30° C. The stirrer is then switched off, and 774 parts of Rhodamine 2C base dry (water content 1% by weight) are added. 262.2 parts of dimethyl sulfate (98% strength by weight) are then added and stirred in for 10 minutes. The temperature is then gradually raised to 70°–80° C. Thereafter the internal temperature rises without heat supply to about 105°–120° C. as a consequence of the exothermic reaction. From attainment of an internal temperature of 105° C. stirring is continued at about 110°–120° C. for a further hour, when the esterification will have ended.

600 parts of cold water are then added with stirring and then stirred in for a quarter of an hour. The temperature adjusts to about 70° C., and the pH is in the range 6.8–7.6.

A further kettle is charged with 2,400 parts of cold water, and 67.5 parts of 50% strength by weight sodium hydroxide solution are added with stirring. This initial charge of sodium hydroxide solution is admixed with the contents from the stirred kettle. The temperature adjusts to around 40° C. To hydrolyze the propylene carbonate, stirring is continued for about an hour, and 120 parts of concentrated hydrochloric acid are then added to adjust the pH to 4.5–4.0. After the acid has been added, the temperature is raised to about 95° C. to dissolve all of the dye.

To remove small amounts of impurities, if necessary after prior addition of about 30 parts of active charcoal, the mixture is clarified by filtration. The filtrate is heated to 90° C. and admixed with 220.5 parts of concentrated hydrochloric acid. The mixture is cooled down to about 80° C., and a total of 378 parts of sodium chloride are then added to salt out the dye. After about 6–7 hours of cooling to below 50° C., the dye crystals are filtered off with suction and dried to leave 855 parts of the dye methyl ester chloride which, in color strength, hue and brightness, is on spec and surprisingly, notwithstanding the alkali treatment, contains only very small amounts of hydrolyzed dye.

EXAMPLE 2

A stirred kettle is charged with 84 parts of technical grade propylene carbonate and 156 parts of technical grade ethylene carbonate, followed by 15 parts of calcium hydroxide with stirring. 402 parts of Rhodamine 2C base (water content 1% by weight) and 167.2 parts of diethyl sulfate (98% strength by weight) are then added. The mixture is stirred and heated until the onset of the exothermic reaction, and the internal temperature is allowed to rise to 105°–120° C. After one hour of stirring 600 parts of cold water are added.

A further kettle is charged with 2,400 parts of cold water, and 35 parts of 50% strength by weight sodium hydroxide solution are added with stirring. This initial charge of sodium hydroxide solution is then admixed with the contents from the stirred kettle, and the admixture is subsequently stirred for about an hour. The pH is then adjusted to 4.5–4.0 in the course of 1 hour by adding 65 parts of concentrated hydrochloric acid. In the course of the addition of the acid, $CO_2$ escapes. The temperature should not exceed 50° C. After the acid has been added, the temperature is raised to about 95° C. to dissolve all of the dye. Any impurities present in small amounts are removed by adding 17 parts of active charcoal and clarifying by filtration. The hot filtrate at 90° C. is then admixed with 135 parts of concentrated hydrochloric acid. The mixture is cooled down to about 80° C., and the dye is salted out by adding a total of 237 parts of sodium chloride a little at a time. After 6–7 hours of cooling to below 50° C., the dye crystals are filtered off with suction and dried.

436 parts are obtained of rhodamine ethyl ester chloride which, coloristically, conforms to on-spec product.

EXAMPLE 3

The reactor is charged with 296 parts of γ-butyrolactone and 26 parts of triisopropanolamine, and the contents are stirred. 262 parts of Rhodamine 2C base dry (water content 1% by weight) and 112.1 parts of diethyl sulfate (98% strength by weight) are then likewise stirred in. After the temperature has been raised to 80° C., the heat supply is switched off and stirring is continued at the autogenous internal temperature of about 110° C. for from 1 to 1½ hours.

345 parts of technical grade acetic acid and 31 parts of water are then added. 325 parts of this liquid formulation correspond to 100 parts of the dye powder obtained in Example 1 as regards the photometrically measured color strength. The liquid formulation is stable to storage even at −10° C.

Compared with the liquid formulation obtained in Example 5 of U.S. Pat. No. 2,228,260, this liquid dye is substantially improved in buildup in the coloration of paper pulp.

EXAMPLE 4

In a procedure similar to that of Example 3, 280 parts of dry rhodamine base B are esterified in 140 parts of γ-butyrolactone and 26 parts of triisopropanolamine by addition of 109 parts of 98% strength by weight dimethyl sulfate. Dilution with 220 parts of acetic acid and 30 parts of water gives a liquid dye which is stable to storage.

225 parts of this liquid dye correspond to 100 parts of a comparable pulverulent product.

EXAMPLE 5

A reactor is charged with 125 parts of γ-butyrolactone and 16 parts of triisopropanolamine, and the contents are stirred. 91.2 parts of dry Rhodamine 2C base and 128.4 parts of dry rhodamine base B are then added. 88 parts of 98% strength by weight diethyl sulfate are then added and stirred in at room temperature for 15 minutes. The internal temperature is then raised to 80° C., and the temperature then rises to about 105° C. due to the exothermic reaction. From attainment of this temperature stirring is continued for about 1 hour. Thereafter 273 parts of technical grade acetic acid and 93 parts of water are added with stirring.

Compared with the liquid formulation obtained as described in Example 4 of U.S. Pat. No. 2,228,260, this liquid dye is substantially improved in buildup on paper in pulp coloration.

EXAMPLE 6

210 parts of diethyl carbonate, 14 parts of triisopropanolamine, 55 parts of diethyl sulfate (98% strength by weight) and 140 parts of rhodamine base B are heated with stirring to 80° C. and then heated to about 100° C. for a further 2 hours. The mixture is then cooled down to about 50° C., 200 parts of a liquid salicylic acid/formaldehyde condensation product are added as a fixative, and the mixture is heated with stirring at about 70° C. for 1 hour and then cooled down.

The result is a liquid formulation which is stable to storage even in the cold at −10° C.; it is useful for printing inks. No unesterified dye is detectable by thin layer chromatography.

EXAMPLE 7

312 parts by volume of mixed xylene isomers, 78 parts of propylene carbonate (technical grade) and 13 parts of calcium hydroxide are stirred together, 258 parts of dry Rhodamine 2C base and 88.5 parts of dimethyl sulfate (98% strength by weight) are then added, and the temperature is raised to 70° C. After the exothermic reaction has died down, stirring is continued at around 100° C. for a further 2 hours. Water is then added, and the xylene is distilled off azeotropically in a mixture with water, the water being run back in.

To obtain the dye methyl ester chloride, Example 1 is followed for the rest of the procedure.

Instead of removing the xylene by azeotropic distillation with water, it is also possible to evaporate it directly.

If instead of using 78 parts of propylene carbonate only 50 parts are used, the esterification with dimethyl sulfate does not go to completion. If no propylene carbonate is present at all, the result is a reaction mixture containing about 15% of unesterified dye.

EXAMPLE 8

150 parts of dibutyl phthalate, 14 parts of triisopropanolamine, 140 parts of rhodamine base B and 55 parts of diethyl sulfate (98% strength by weight) are heated with stirring at 110° C. for 1 hour, 370 parts of a liquid salicylic acid/formaldehyde condensation product are then added as a fixative, and stirring is continued at 80°–90° C. for a further hour. A thin layer chromatography test shows no unesterified dye. The liquid formulation thus obtained is suitable for use as an ink in ink jet processes.

We claim:

1. A process for preparing a completely esterified rhodamine dye of the formula I
where R, $R^2$ and $R^4$ are identical or different and each is independently of the others methyl or ethyl, $R^1$ and $R^3$ are identical or different and each is independently of the other hydrogen, methyl or ethyl, $R^5$ and $R^6$ are identical or different and each is independently of the other hydrogen or methyl, and $A^\ominus$ is an anion, from a compound of the formula II
or from a corresponding water addition product by esterification with a dialkyl sulfate in a solvent, which comprises using γ-butyrolactone, alkylene carbonate, dialkyl carbonate, methoxypropyl acetate or a dialkyl phthalate as solvent and working in the presence of a molar excess of a base, based on the dialkyl sulfate.

2. A process as claimed in claim 1, wherein the solvent used is γ-butyrolactone, ethylene carbonate, 1,2-propylene carbonate, 1,2-n-butylene carbonate, 1,2-isobutylene carbonate, dimethyl carbonate, diethyl carbonate, dipropyl carbonate, dimethyl phthalate, diethyl phthalate, dipropyl phthalate, dibutyl phthalate or dioctyl phthalate.

3. A process as claimed in claim 1, wherein the solvent used is γ-butyrolactone.

4. A process as claimed in claim 1, wherein the solvent used is an alkylene carbonate.

5. A process as claimed in claim 1, wherein the solvent used is a dialkyl carbonate.

6. A process as claimed in claim 1, wherein the solvent used is methoxypropyl acetate.

7. A process as claimed in claim 1, wherein the solvent used is a dialkyl phthalate.

8. A process as claimed in claim 1, wherein the solvent used is ethylene carbonate.

9. A process as claimed in claim 1, wherein the solvent used is 1,2-propylene carbonate.

10. A process as claimed in claim 1, wherein the solvent used is 1,2-n-butylene carbonate.

11. A process as claimed in claim 1, wherein the solvent used is 1,2-iso-butylene carbonate.

12. A process as claimed in claim 1, wherein the solvent used is dimethyl carbonate.

13. A process as claimed in claim 1, wherein the solvent used is diethyl carbonate.

14. A process as claimed in claim 1, wherein the solvent used is dipropyl carbonate.

15. A process as claimed in claim 1, wherein the solvent used is dimethyl phthalate.

16. A process as claimed in claim 1, wherein the solvent used is diethyl phthalate.

17. A process as claimed in claim 1, wherein the solvent used is dipropyl phthalate.

18. A process as claimed in claim 1, wherein the solvent used is dibutyl phthalate.

19. A process as claimed in claim 1, wherein the solvent used is dioctyl phthalate.

20. A process as claimed in any of claims 1, 2 or 3, wherein the base used is an alkali metal hydroxide or oxide, an alkaline earth metal hydroxide or oxide, a basic aluminum oxide or a tertiary organic amine containing sterically hindered nitrogen.

21. A process as claimed in claim 20, wherein the base used is an alkali metal hydroxide.

22. A process as claimed in claim 20, wherein the based used is an alkali metal oxide.

23. A process as claimed in claim 20, wherein the base used is an alkaline earth metal hydroxide.

24. A process as claimed in claim 20, wherein the base used is an alkaline earth metal oxide.

25. A process as claimed in claim 20, wherein the base used is a basic aluminum oxide.

26. A process as claimed in claim 20, wherein the base used is a basic tertiary organic amine containing sterically hindered nitrogen.

* * * * *